(12) United States Patent  (10) Patent No.: US 7,748,744 B2
Suyama et al.  (45) Date of Patent: Jul. 6, 2010

(54) SEAT BELT APPARATUS

(75) Inventors: Yoji Suyama, Tokyo (JP); Yuki Tabata, Tokyo (JP); Hideki Nishimine, Tokyo (JP)

(73) Assignee: Takata Corporation, Tokyo (JP)

( * ) Notice: Subject to any disclaimer, the term of this patent is extended or adjusted under 35 U.S.C. 154(b) by 107 days.

(21) Appl. No.: 12/232,666

(22) Filed: Sep. 22, 2008

(65) Prior Publication Data

US 2009/0085341 A1  Apr. 2, 2009

(30) Foreign Application Priority Data

Oct. 2, 2007  (JP) .............................. 2007-258856

(51) Int. Cl.
*B60R 22/36* (2006.01)
(52) U.S. Cl. ...................................... 280/806
(58) Field of Classification Search ......... 280/806–808; 297/474–480
See application file for complete search history.

(56) References Cited

U.S. PATENT DOCUMENTS

| | | | |
|---|---|---|---|
| 4,993,746 A | 2/1991 | Hagelthorn | |
| 5,415,433 A | 5/1995 | Pfeiffer | |
| 6,250,684 B1 | 6/2001 | Gleason et al. | |
| 6,446,897 B1 * | 9/2002 | Arima et al. ................. | 242/374 |
| 6,749,225 B1 * | 6/2004 | Clute et al. .................. | 280/806 |
| 7,370,822 B2 * | 5/2008 | Hiramatsu ............... | 242/379.1 |

FOREIGN PATENT DOCUMENTS

| | | |
|---|---|---|
| DE | 199 13 423 C1 | 5/2000 |
| JP | 8-301067 A | 11/1996 |
| JP | 2006-282164 A | 10/2006 |

OTHER PUBLICATIONS

European Search Report issued in corresponding European application No. 08016272; 2 pages.

* cited by examiner

*Primary Examiner*—Faye M. Fleming
(74) *Attorney, Agent, or Firm*—Foley & Lardner LLP

(57) ABSTRACT

A seat belt apparatus including a seat belt through anchor including a hanging shaft that a seat belt withdrawn from a retractor is hung on. The seat belt anchor also includes an anchor base that supports both ends of the hanging shaft. The anchor base includes a shaft non-rotatably supported by the anchor base at both ends and a tube body rotatably attached outside the shaft. The seat belt through anchor additionally includes a stopping mechanism for preventing rotation of the hanging shaft when a pressing force of a predetermined magnitude or more is applied to the tube body from the seat belt.

8 Claims, 13 Drawing Sheets

FIGS. 6
(a) 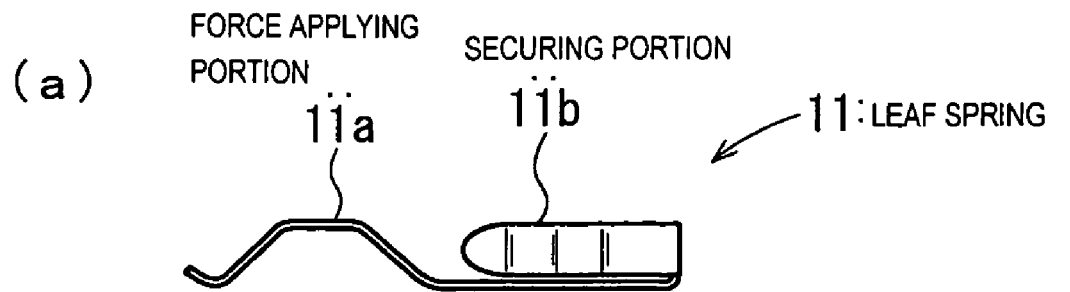
(b) 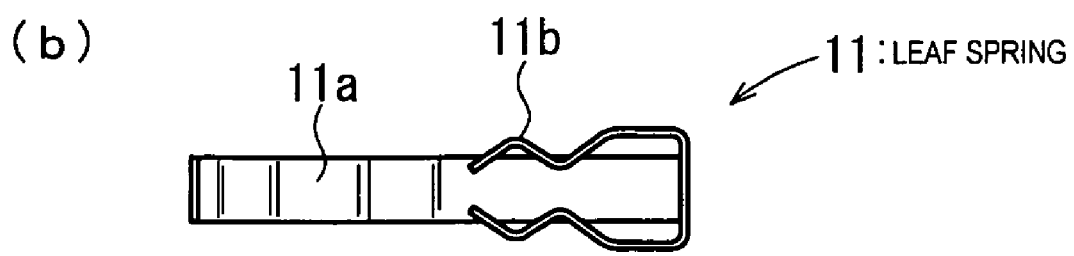

SEAT BELT APPARATUS

BACKGROUND

The present invention relates to a seat belt apparatus including a through anchor through which a seat belt is hung.

In a seat belt apparatus, a seat belt withdrawn from a retractor is hung through a through anchor and is routed to the front side of an occupant. The apparatus typically includes a tongue and buckle device.

SUMMARY

One embodiment of the invention relates to a seat belt through anchor including a hanging shaft that a seat belt withdrawn from a retractor is hung on. The seat belt anchor also includes an anchor base that supports both ends of the hanging shaft. The anchor base includes a shaft non-rotatably supported by the anchor base at both ends and a tube body rotatably attached outside the shaft. The seat belt through anchor additionally includes a stopping mechanism for preventing rotation of the hanging shaft when a pressing force of a predetermined magnitude or more is applied to the tube body from the seat belt. The stopping mechanism includes a projected portion formed on either of the outer periphery of the shaft or the inner periphery of the tube body and a recessed portion formed on the other. Additionally, the projected portion can engage the recessed portion. The stopping mechanism also includes a spring disposed between the tube body and the shaft. When the pressing force applied to the tube body from the seat belt is smaller than a predetermined value, then the spring can apply a force to the tube body such that the recessed portion and the projected portion are separated from each other. When a pressing force of the predetermined value or more is applied to the tube body from the seat belt, the tube body approaches the shaft, and the projected portion and the recessed portion are mutually engaged. As a result, rotation of the tube body is prevented.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 6(a) is a side view of a leaf spring used for the through anchor, according to an exemplary embodiment.

FIG. 6(b) is a top view of the leaf spring.

DETAILED DESCRIPTION

Figure 1:
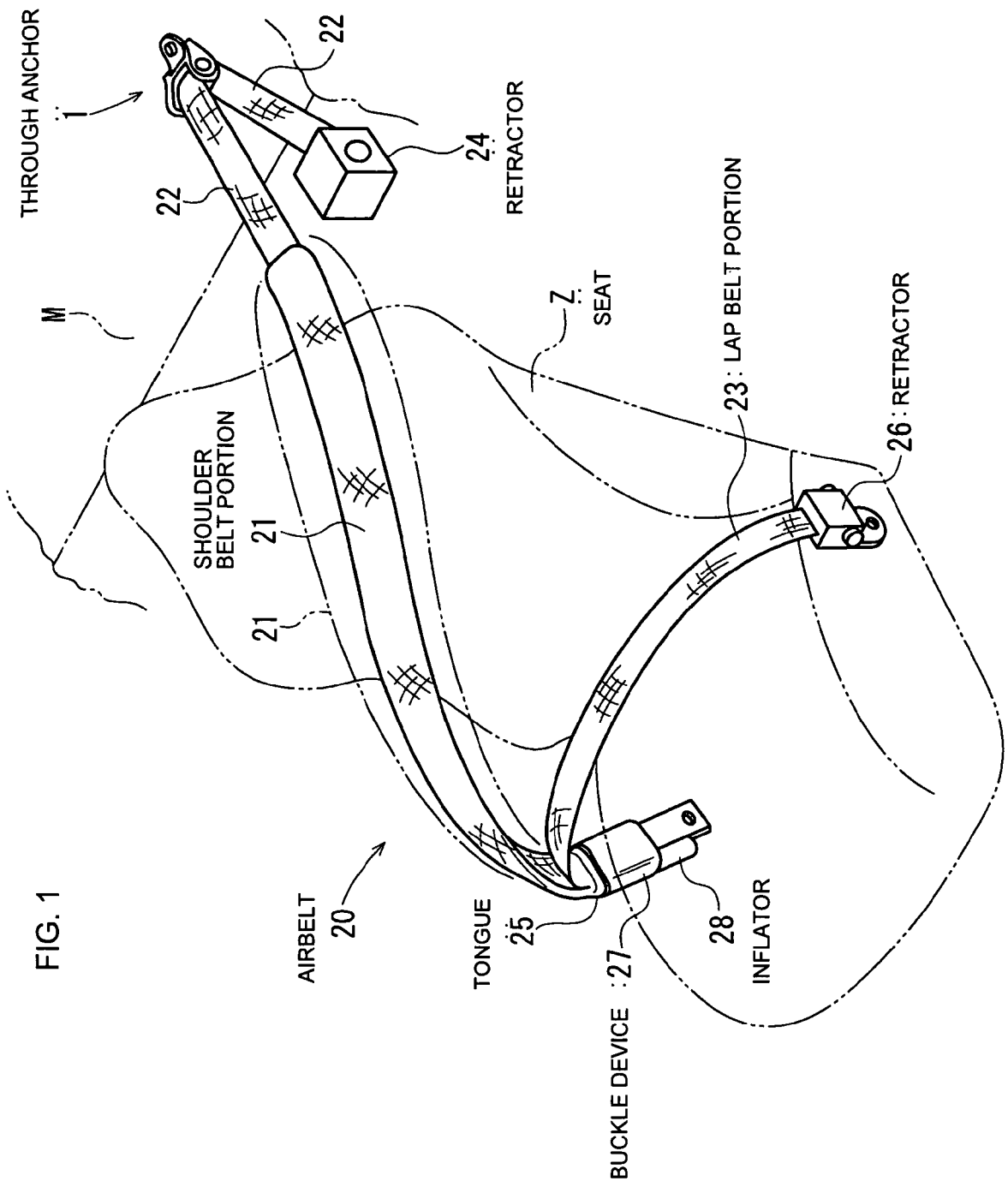
FIG. 1 is a perspective view of a seat belt apparatus including a through anchor, according to an exemplary embodiment.
Figure 2:
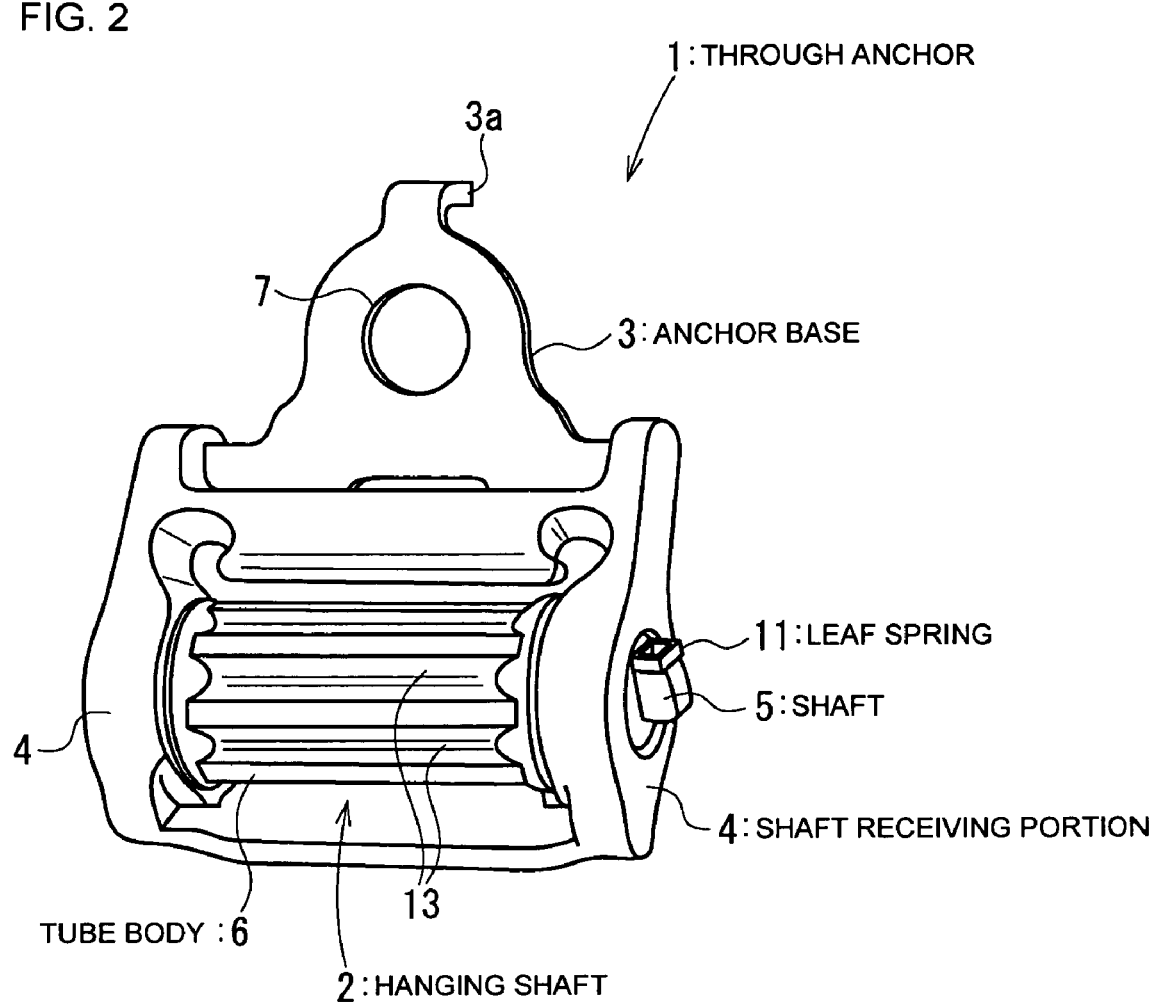
FIG. 2 is a perspective view of the through anchor.

When a seat belt is withdrawn or retracted, a friction force of a through anchor is applied to the seat belt. A structure is known in which a through anchor includes a freely rotatable hanging shaft, thereby reducing the friction force. As a result, the seat belt may be smoothly withdrawn or retracted. Further, the seat belt may be hung on the hanging shaft.

Additionally, a seat belt including an energy absorbing (EA) mechanism incorporated in a retractor is known. The retractor locks withdrawal of a seat belt to restrain an occupant to a seat in the event of an emergency, such as a vehicle collision. After withdrawal of the seat belt is locked, the EA mechanism can gradually feed a seat belt from a retractor, while a load is applied to the seat belt from the occupant. Thus, the EA mechanism can absorb an impact applied to an occupant.

If the hanging shaft of a through anchor is rotatable, and an occupant's load is applied to a seat belt after withdrawal of the seat belt is locked, then the load is applied to an EA mechanism. The applied load is subjected to a small friction force of the through anchor. Therefore, there is a need to employ an EA mechanism capable of bearing a heavy load. As a result, the cost and weight of the EA mechanism can increase.

A seatbelt apparatus including a through anchor having a stopping mechanism is described in U.S. Pat. No. 4,993,746, which is herein incorporated by reference in its entirety. The stopping mechanism prevents rotation of a hanging shaft when a pressing force of a predetermined magnitude or more is applied to the hanging shaft from a seat belt. The hanging shaft includes a shaft (spindle) non-rotatably supported at both ends by an anchor base (clevis) and a tube body (roller) rotatably attached outside the shaft. The inner diameter of the tube body is larger than the outer diameter of the shaft. From the outer periphery of the shaft, a projected portion (tooth) is provided. On the inner periphery of the tube body, a plurality of projected portions (teeth) extending in a direction along the axis center line of the tube body are provided. The project portions (teeth) are spaced apart from each other in the circumferential direction of the tube body. The space between the adjacent projected portions is a recessed portion with which the projected portion of the shaft can engage.

In the device disclosed in the aforementioned publication, the circumferential portions on each end of the tube body along the axis center line direction are elastically deformable (spring extensions). The elastically deformable portions are composed of a flexible material such as neoprene.

On each of the both end faces of the tube body in the axis center line direction, an annular end cap (end cap) is attached, and the shaft is inserted through the center hole of each of the end caps. The tube body is supported by the shaft through the intermediary of the end caps so that the projected portion and the recessed portions are separated from each other.

While the force applied to the tube body from a seat belt hung thereon is smaller than a predetermined value, the elastically deformable portions on each end of the tube body are not deformed. Since the recessed portions on the inner periphery of the tube body and the projected portion on the outer periphery of the shaft are separated from each other, the tube body is freely rotatable.

According to an exemplary embodiment, the pressing force applied to the tube body from the seat belt is greater than or equal to a predetermined value. As a result, the elastically deformable portions on both ends of the tube body buckle. Therefore, the tube body approaches the shaft, and the projected portion and one of the recessed portions are mutually engaged. Thus, the tube body becomes non-rotatable. As a result, a friction force is applied to the seat belt from the tube body.

In the through anchor disclosed in U.S. Pat. No. 4,993,746, both sides of the tube body in the axis center line direction are formed to be elastically deformable portions. Since the elastically deformable portions constitute a part of the exterior of the tube body, the elastically deformable portions and a seat belt hung on the tube body rub against each other. Therefore, the elastically deformable portions have high durability as well as specified deformation properties. The cost of a through anchor provided with such a tube body is high.

A seat belt through anchor including a seat belt hanging shaft and a stopping mechanism is described further below. The stopping mechanism can prevent rotation of the tube body when a pressing force of a predetermined magnitude or more is applied to the tube body from a seat belt. The seat belt hanging shaft is constructed of a shaft non-rotatably supported at both ends by an anchor base and a tube body rotatably attached outside the shaft. The seat belt through anchor can be constructed at low cost and have high durability.

A seat belt through anchor includes a hanging shaft. On the hanging shaft a seat belt withdrawn from a retractor can be hung. An anchor base supports both ends of the hanging shaft. The hanging shaft includes a shaft non-rotatably supported by the anchor base at both ends and a tube body rotatably attached outside the shaft. The seat belt through anchor includes a stopping mechanism for preventing rotation of the hanging shaft when a pressing force of a predetermined magnitude or more is applied to the tube body from the seat belt. The stopping mechanism includes a projected portion formed on either of the outer periphery of the shaft or the inner periphery of the tube body and a recessed portion formed on the other. The projected portion is engageable by the recessed portion. When the pressing force applied to the tube body from the seat belt is smaller than the predetermined value, a spring disposed between the tube body and the shaft applies a force to the tube body such that the recessed portion and the projected portion are separated from each other When a pressing force of the predetermined value or more is applied to the tube body from the seat belt, the tube body approaches the shaft, and the projected portion and the recessed portion are mutually engaged. Thus, rotation of the tube body is prevented.

According to an exemplary embodiment, the seat belt through anchor may be configured so that the spring is a leaf spring extending in a direction parallel to the axis center line of the hanging shaft.

According to another exemplary embodiment, the seat belt through anchor is configured so that the shaft includes a guide surface. The guide surface is configured to guide the movement of the tube body. The tube body is movable along the guide surface in an approaching and separating direction with respect to the shaft, wherein the guide surface extends in a direction parallel to a bisecting line L3. Thus, the guide surface bisects an intersection angle θ between one extension direction L1 and another extension direction L2. In the extension direction L1, the seat belt extends on the side of the retractor relative to the tube body. In the extension direction L2, the seat belt extends on the side of an occupant seated on a seat relative to the tube body, in a state that the seat belt is worn by the occupant seated on the seat.

According to an exemplary embodiment, a seat belt apparatus includes a seat belt routed along the body of an occupant seated on a seat. The seat belt apparatus also additionally includes a seat belt is hung through a through anchor. The seat belt apparatus also includes a retractor, to which the rear end side of the seat belt is connected such that the seat belt can be retracted and withdrawn.

According to an exemplary embodiment, a vehicle is configured so that the through anchor is mounted on a member in a rearward position relative to a vehicle seat. Thus, the extension direction of the shaft occurs along the vehicles width.

According to an exemplary embodiment, a vehicle is configured so that the through anchor is mounted on a pillar portion of the vehicle. Thus, the extension direction of the shaft occurs along the vehicles length.

According to an exemplary embodiment, in a seat belt through anchor, and in a seat belt apparatus in a vehicle using the through anchor of the present invention, a spring is installed between a tube body and a shaft of the through anchor. The spring applies a force to the tube body such that a projected portion and a recessed portion, formed on the inner periphery of the tube body and the outer periphery of the shaft respectively, are separated. As a result, the whole of the tube body can be constructed of hard materials. Therefore, the durability of the tube body can be improved. Additionally, since a tube body equivalent to a conventional tube body constructed from low-cost plastic can be employed, it is possible to construct the through anchor 1 at relatively low cost.

According to an exemplary embodiment of the present disclosure, a leaf spring is preferably used as the spring for applying a force to the tube body. The leaf spring is inexpensive. Additionally, of the installation space for a spring can be saved by positioning the leaf spring such that the leaf spring extends in a direction parallel to the axis center line of the hanging shaft.

According to an exemplary embodiment, the shaft includes a guide surface for guiding the movement of the tube body. The guide surface extends in a direction parallel to a bisecting line L3, thereby bisecting an intersection angle θ between an extension direction L1 and another extension direction L2. In the extension direction L1 the seat belt extends on the side of the retractor relative to the tube body. In the extension direction L2 the seat belt extends on the side of an occupant seated on a seat relative to the tube body, in a state that the seat belt is worn by the seated occupant. Thus, when a pressing force of a predetermined magnitude or more is applied to the tube body, the tube body approaches the shaft while being guided by the guide surface. Therefore, the locking of the tube body is smoothly implemented.

According to an exemplary embodiment, when a pressing force is applied to the tube body from the seat belt when the seat belt is not worn, (e.g., when the seat belt is withdrawn, or when the seat belt is retracted), the direction of the pressing force and the extension direction of the guide surface are intersected with each other. Thus, the tube body is limited in approaching the shaft. Therefore, locking of the tube body when the seat belt is withdrawn and/or retracted is suppressed. As a result, withdrawing and retracting of the seat belt can be smoothly carried out.

According to the present disclosure, the through anchor can be mounted on a member in a rearward position of a vehicle seat such that the extension direction of the shaft along the vehicles width. Additionally, the through anchor can be mounted on a pillar portion of the vehicle such that the extension direction of the shaft occurs along the vehicles length.

Referring to FIG. 1, a perspective view of a seat belt apparatus is shown. The seat belt apparatus includes a through anchor according to an embodiment of the present disclosure. The through anchor, that is installed lengthwise along the vehicle, is shown to be oriented along the up-and-down direction of the drawing in FIGS. 2, 3 and FIGS. 9, 10.

According to an exemplary embodiment, a through anchor 1 is installed in a vehicle in which a driver's seat and a passenger's seat are included and no rear seat is included. However, the present disclosure is not limited to any particular model of vehicle.

The through anchor 1 includes a hanging shaft (or first shaft) 2 on which a seat belt is hung. An anchor base 3 supports the hanging shaft 2. The hanging shaft 2 includes a shaft (or second shaft) 5 non-rotatably mounted across a pair of shaft receiving portions 4 provided to the anchor base 3, and a tube body 6 rotatably attached outside the shaft 5.

As shown in FIG. 1, the through anchor 1 is mounted on a behind-a-seat member M in a vehicle body such that the shaft 5 extends along a vehicle width direction (i.e., a left and right direction). The anchor base 3 is disposed such that the shaft receiving portions 4 are located on the vehicle front side, and the opposite side thereof is located on the vehicle rear side. The anchor base 3 is provided with a bolt insertion hole 7 on the side opposite to the shaft receiving portions 4. The through anchor 1 is joined to the behind-a-seat member M using an anchor bolt B through the bolt insertion hole 7 so as to be pivotable in a substantially vehicle width direction. Reference numeral 3a denotes a lug by which the pivot angle of the anchor base 3 is restricted.

Figure 5:
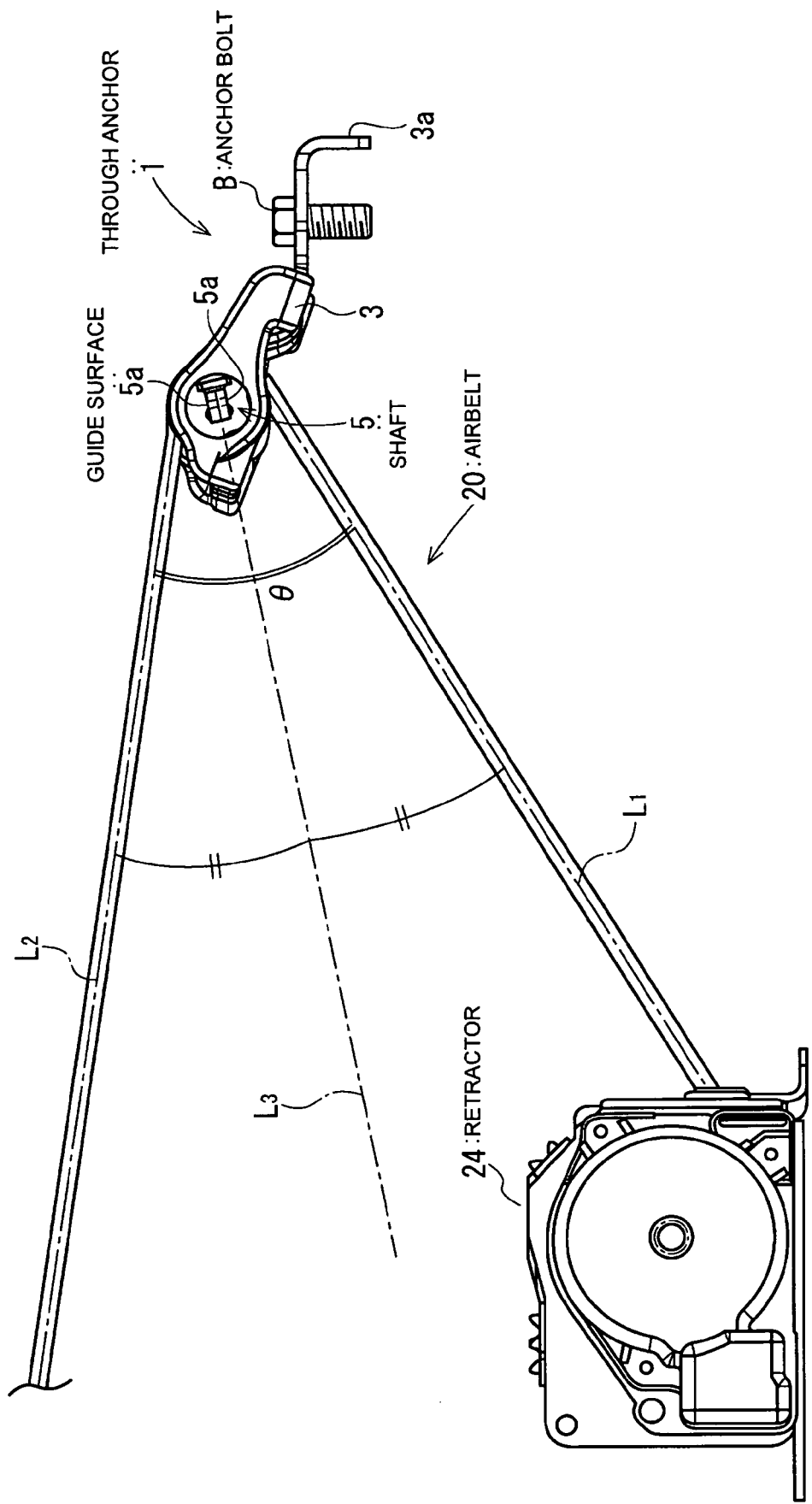
FIG. 5 is a side view of a seat belt apparatus including the through anchor configured for use with an airbelt as a seat belt and the vicinity of the through anchor.

According to the exemplary embodiment, a retractor 24 is installed on the vehicle front side relative to the through anchor 1. The retractor is located at a position lower than the through anchor 1, as shown in FIG. 5. From retractor 24, an airbelt 20 being a seat belt is withdrawn. Airbelt 20 is withdrawn from the retractor 24 in a vehicle rear direction. Airbelt 20 is then hung on the tube body 6 after being passed so as to be detoured from the underside of the tube body 6 to the upperside of the tube body 6 through the back of the tube body 6 on its vehicle rear side. Then, the airbelt 20 is routed from the tube body 6 toward the vehicle front side.

It should be noted that in FIG. 5 the airbelt 20 is shown being worn by an occupant, in which the airbelt 20 is routed on the front side of an occupant (not shown) seated on a seat Z (FIG. 1) and is latched to a buckle device 27 described later. The dot-and-dash line L1 in FIG. 5 indicates the direction of the airbelt 20 extending on the side of the retractor 24 relative to the tube body 6 while being worn. The dot-and-dash line L2 indicates the direction of the airbelt 20 extending on the side of the occupant relative to the tube body 6 while being worn. The dot-and-dash line L3 indicates the bisecting line bisecting an intersection angle θ constituted between the extension directions L1, L2. As shown in FIG. 5, the bisecting line L3 extends along the vehicles length and also in a slightly downward direction toward the vehicle front side.

The shaft (or second shaft) 5 is a square bar-like member including a rectangular cross-sectional shape in a direction intersecting its longitudinal direction in this embodiment. Hereafter, a cross section of the shaft 5 means the cross section in a direction intersecting its longitudinal direction. In this embodiment, among the outer surfaces of the shaft 5, a pair of side faces extending along a longer edge direction of the cross section become guide surfaces 5a. Guide surface 5a can guide the movement of the tube body 6.

Figure 3:
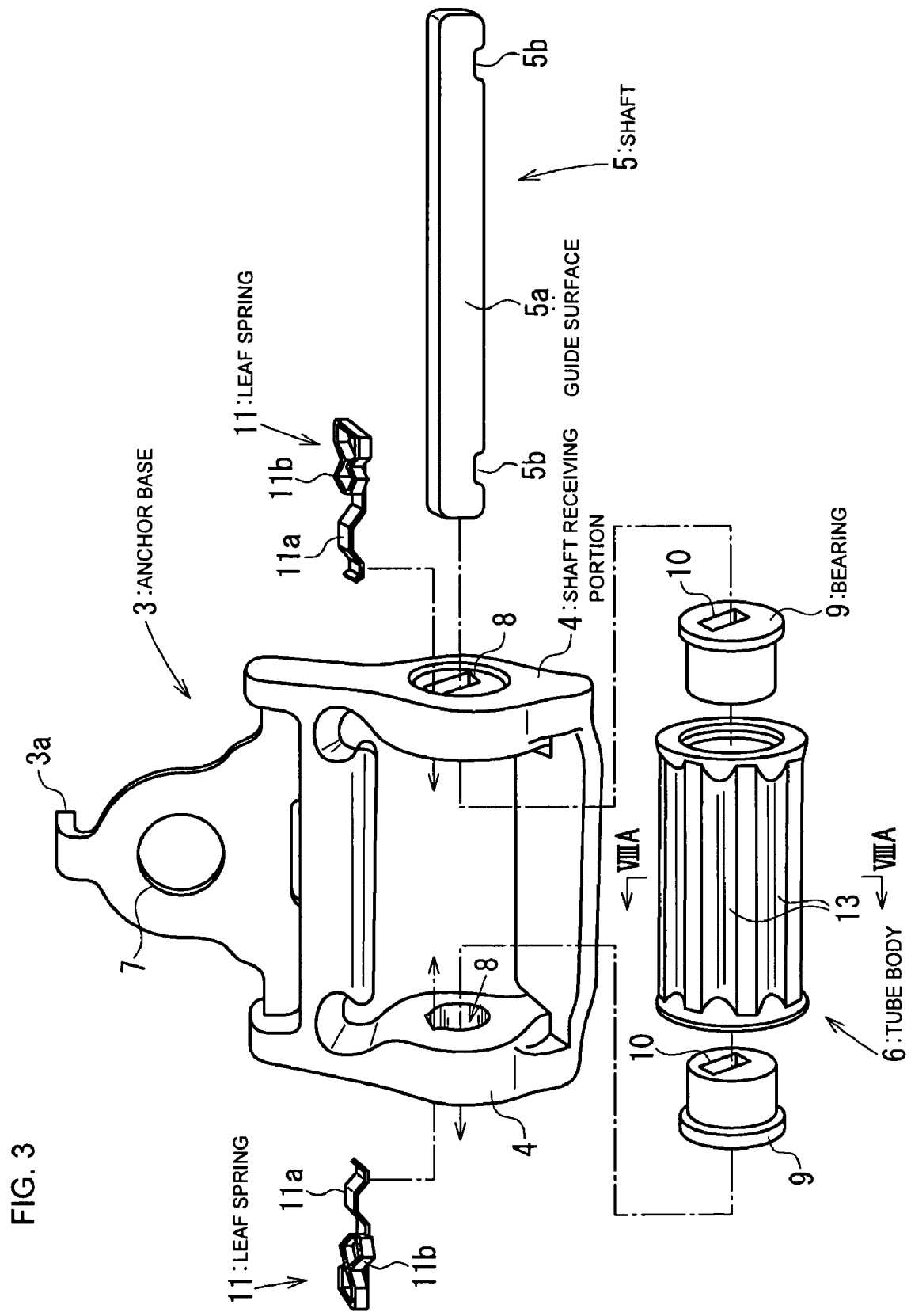
FIG. 3 is an exploded perspective view of the through anchor.

It should be noted that, although the shaft 5 is a member formed in one piece at a predetermined thickness from the beginning as shown in FIG. 3, a square bar-like shaft 5 may be constructed from plural thicknesses of a strip-like plain shaft having a thin thickness.

Figure 4:
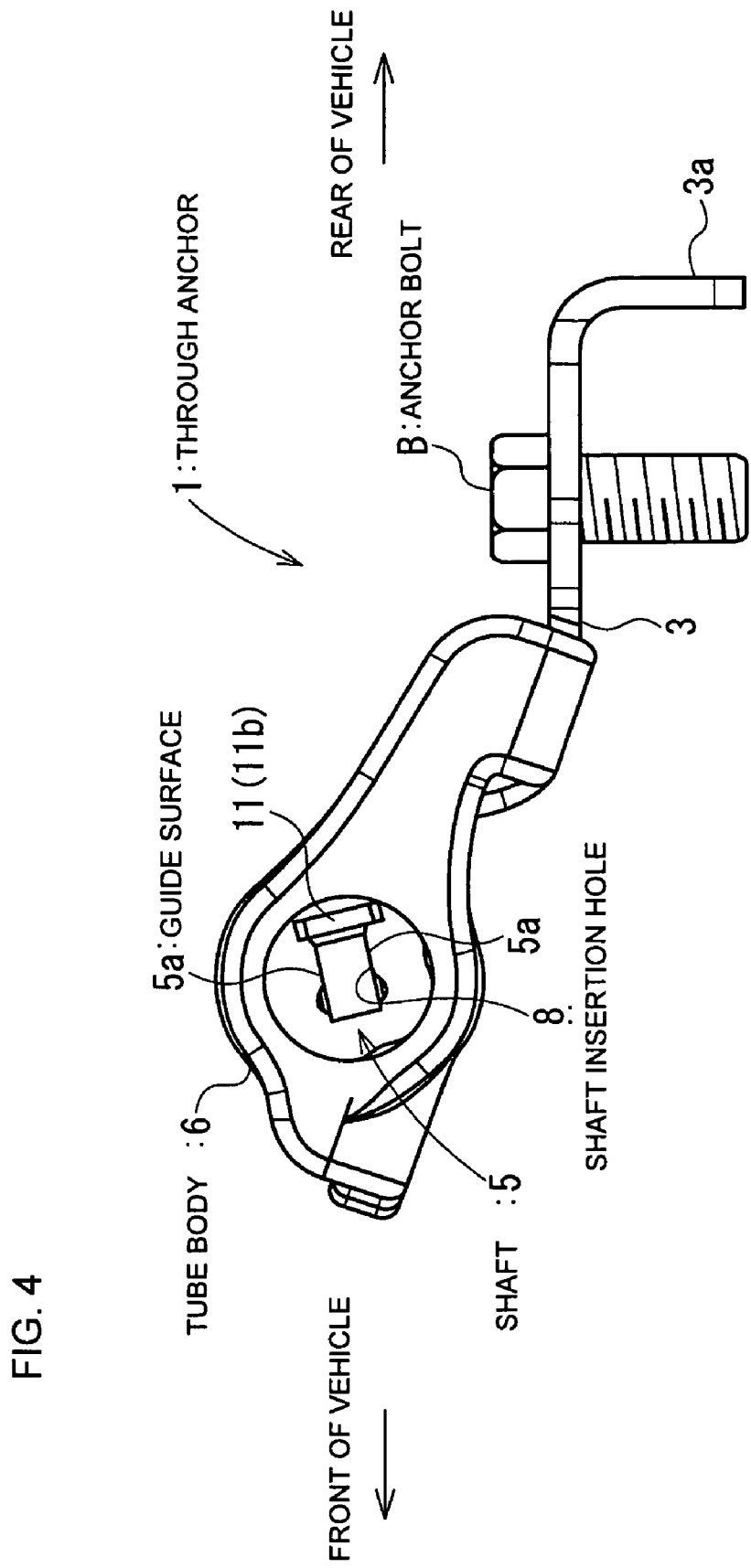
FIG. 4 is a side view of an anchor base of the through anchor.

The shaft receiving portions 4 are disposed apart from each other by a predetermined distance along the vehicles width. Each of the shaft receiving portions 4 are provided with a shaft insertion hole 8. Shaft insertion hole 8 passes shaft receive portions 4 along the vehicles width. As shown in FIG. 4, the shaft insertion hole 8 includes an opening shape of a rectangle. The width of the shaft insertion hole 8 in its shorter edge direction is equal to or slightly larger than the width of a cross section of the shaft 5 in its shorter edge direction. Further, the width of the shaft insertion hole 8 in its longer edge direction is equal to or slightly larger than the width of the sum of the width of a cross section of the shaft 5 in the longer edge direction and the thickness of a securing portion 11b of a leaf spring 11 described later.

As shown in FIG. 5, each of the shaft insertion holes 8 is formed so that the longer edges extend in a direction parallel to the above bisecting line L3.

The shaft 5 is inserted to each of the shaft insertion holes 8 such that the longer edge direction of the cross section meets the longer edge direction of the shaft insertion hole 8. Further, both ends of the shaft 5 in the longitudinal direction are held non-rotatably in the shaft insertion holes 8, respectively. That is, the guide surfaces 5a of the shaft 5 extend along a direction parallel to the bisecting line L3 bisecting the intersection angle θ constituted between the one extension direction L1 and the other extension direction L2. In the extension direction L1 the airbelt 20 extends on the side of the retractor 24 relative to the tube body 6. In the extension direction L2 the airbelt 20 extends on the side of an occupant relative to the tube body 6, in a state that the airbelt 20 is worn by a seated occupant, as shown in FIG. 5.

According to an exemplary embodiment, the intersection angle (θ/2) between the bisecting line L3 and each of the extension directions L1, L2 is preferably of the order of 16° to 28°, specifically the order of 20°.

It should be noted that a recessed portion 5b is formed on a surface on both end sides of the shaft 5 along the longitudinal direction. The surface is oriented along the front of the vehicle (the "front face"), and the shaft 5 is positioned (prevented from coming out from either of the shaft insertion holes 8) by an edge portion on the vehicle front side. Further, each of the shaft insertion holes 8 is engaged with the recessed portion 5b.

As shown in FIG. 9(b), the inner diameter of the tube body 6 is larger than the cross-sectional width of the shaft 5 in the diagonal direction. On the inner periphery of the tube body 6, recessed portions 12 are formed with each of angular convex portions 5t (FIG. 9(b)), where a surface of the shaft 5 and each of the guide surfaces 5a intersect with each other. The surface, oriented towards the rear of the vehicle (the "rear face"), can be engaged. The recessed portions 12 extending in the axis line direction of the tube body 6 each include a groove-like shape and are provided in plural number at an even spacing from each other in the circumferential direction of the tube body 6.

According to the embodiment, a bearing 9 is included on each end of the tube body 6 in the axis line direction. According to the embodiment, a large diameter portion 6a is configured on the both ends of the tube body 6. The large diameter portion 6a includes an inner diameter larger than that of the middle side and is fitted with the bearing 9 therein so as to be rotatable.

Figure 7:
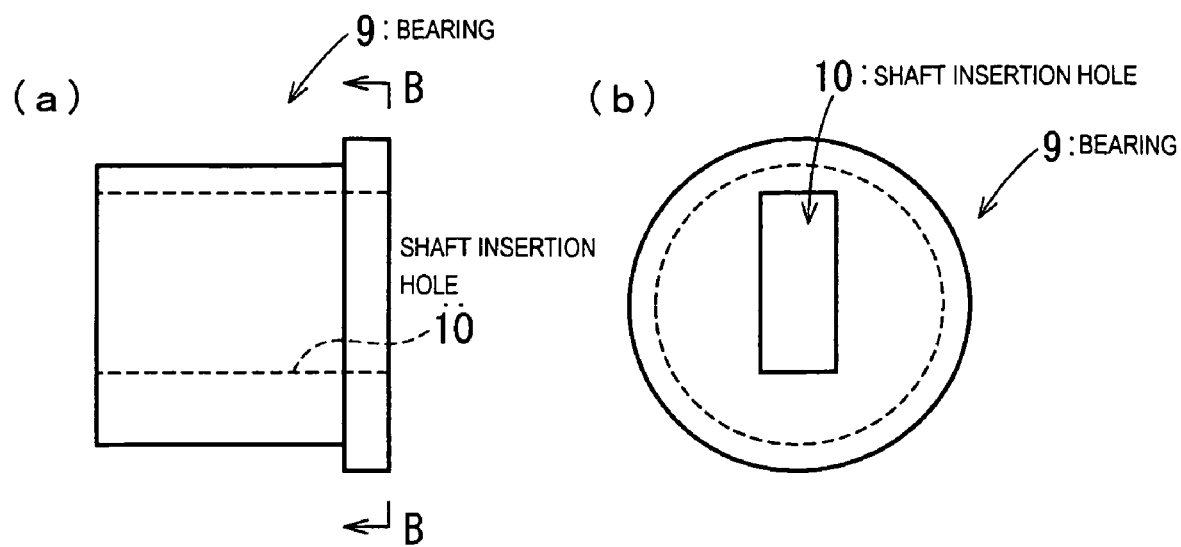
FIG. 7(a) is a side view of a bearing used for the through anchor, according to an exemplary embodiment.
FIG. 7(b) shows an end face view of the bearing (a view along arrows B-B of FIG. 7(a)).
Figure 8:
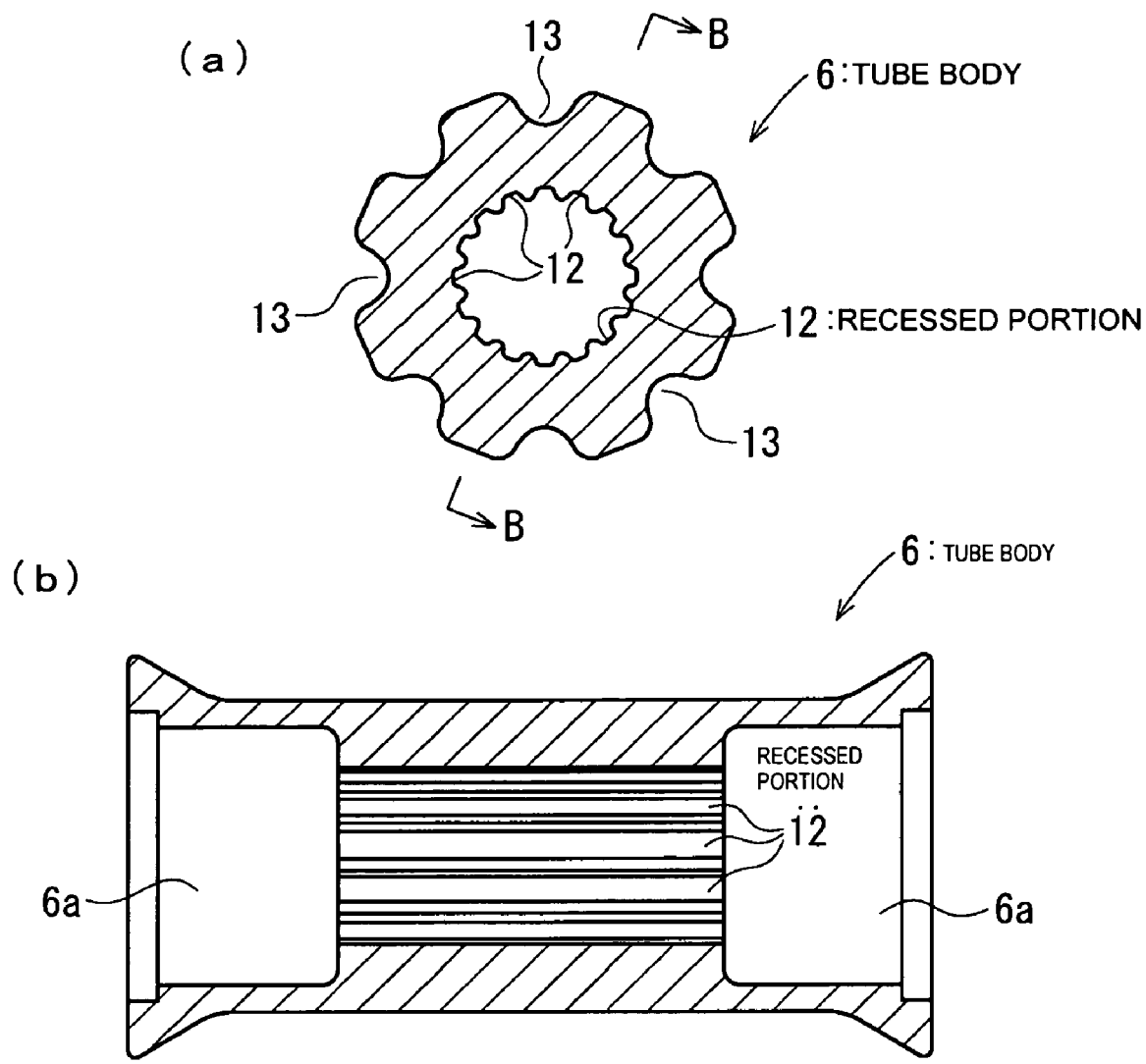
FIG. 8(a) shows a cross-section view of a tube body constituting a hanging shaft of the through anchor (a cross-section view along lines VIIIA-VIIIA of FIG. 3).
FIG. 8(b) is a cross-section view along lines B-B of FIG. 8(a).
Figure 9:
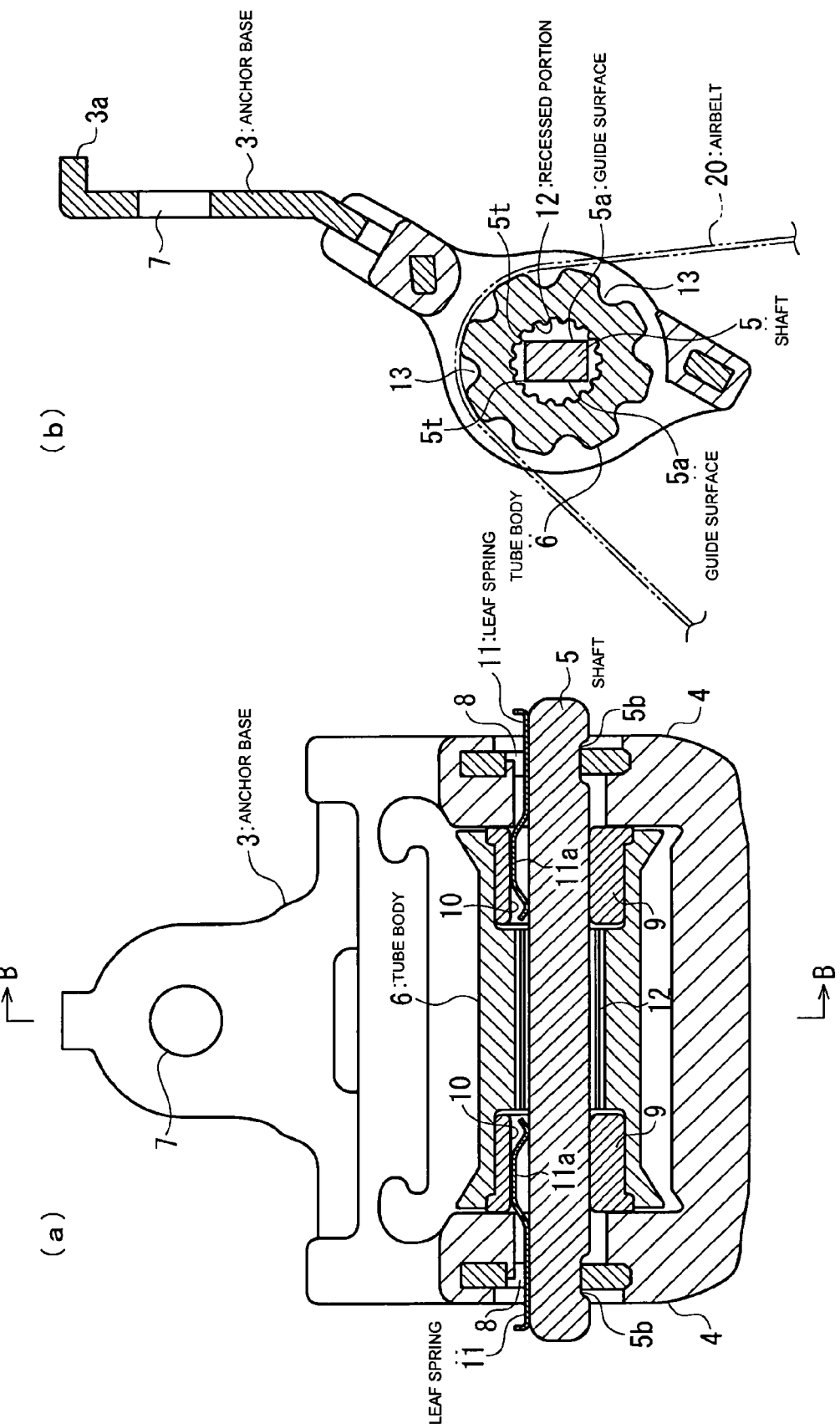
FIG. 9(a) is a vertical cross-section view of the through anchor when not locked, according to an exemplary embodiment.
FIG. 9(b) is a cross-section view along lines B-B of FIG. 9(a).
Figure 10:
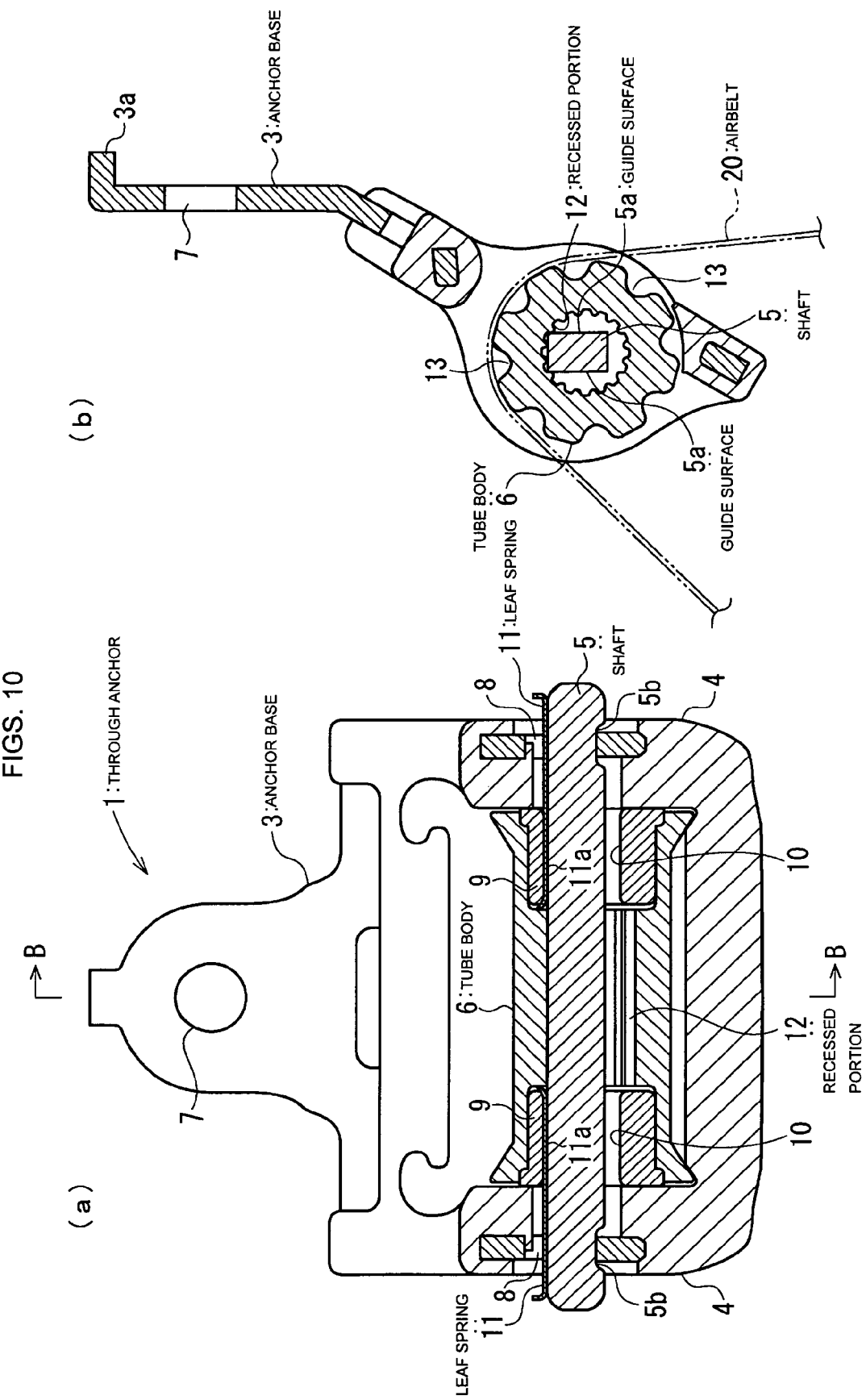
FIG. 10(a) is a vertical cross-section view of the through anchor when locked, according to an exemplary embodiment.
FIG. 10(b) is a cross-section view along lines B-B of FIG. 10(a).

Shown in FIG. 7, the shaft insertion hole 10 of bearings 9 also includes an opening shape of a rectangle. The width of the shaft insertion hole 10 in its shorter edge direction is also equal to or slightly larger than the width of a cross section of the shaft 5 in its shorter edge direction. The width of the shaft insertion hole 10 in its longer edge direction is larger than the width of a cross section of the shaft 5 in the longer edge direction by a predetermined width. To each of the shaft insertion holes 10, the shaft 5 is inserted so that the longer edge direction of its cross section meets the longer edge direction of the shaft insertion hole 10.

Each of the bearings 9 is held non-rotatably with respect to the shaft 5. Bearings 9 are also supported so as to be slidable along the guide surface 5a of the shaft 5 in a direction parallel to the above bisecting line L3.

As a result of the bearings 9, the tube body 6 is supported rotatably with respect to the shaft 5. The tube body 6 is also movable along the guide surface 5a in a direction parallel to the above bisecting line L3.

Further, it should be noted that, as shown in FIGS. 9(a), 9(b), each of the shaft insertion holes 10 is disposed such that the tube body 6 is supported coaxially with respect to the shaft 5. The tube body 6 is supported by bearings 9 in a state that the front face of the shaft 5 is in contact with the edge portion on the vehicle front side (the "front edge") of the shaft insertion hole 10.

A leaf spring 11 can be included between the rear face of the shaft 5 and the edge portion on the vehicle rear side (the "rear edge") of the shaft insertion hole 10 of the respective bearings 9. The leaf spring 11 can apply a force to the bearing 9 in a vehicle rear direction. According to an exemplary embodiment, the leaf springs 11 can be inserted into the shaft insertion hole 10 of the respective bearings 9 from the shaft insertion hole 8 of the respective shaft receiving portions 4 along the rear face of the shaft 5.

The tip side of the leaf spring 11 in the insertion direction can be configured to be a force applying portion 11a bent in a mountain shape toward a vehicle rear direction. This force applying portion 11a is involved between the rear face of the shaft 5 and the rear edge of the shaft insertion hole 10 of the respective bearings 9 to serve for applying a force to the respective bearings 9 toward a vehicle rear direction. Additionally, on the rear end side of the leaf spring 11 in the insertion direction, a securing portion 11b is included to be engaged to the shaft insertion hole 8 of the respective shaft receiving portions 4. The leaf spring 11 is secured (prevented from coming out from either of the shaft insertion holes 10, 8) by the securing portion 11b engaging with the side edge of the shaft insertion hole 8.

The leaf springs 11 can be configured such that, when a pressing force of a predetermined magnitude or more is applied to the tube body 6 from a seat belt hung on the tube body 6 toward the front of the vehicle, the force applying portion 11a can be elastically deformed so as to be flattened. Thus, bearing 9 can move toward the front of the vehicle, thereby allowing tube body 6 to move towards the front of the vehicle.

According to an exemplary embodiment, a stopping mechanism for the tube body 6 can be constructed of angular convex portions 5t of shaft 5, recessed portions 12 inside the tube body 6, and leaf springs 11.

Additionally, recessed portions 13 are included on the outer periphery of the tube body 6 extending in the axis line direction thereof in plural number at an even spacing from each other in the circumferential direction thereof. The recessed portions 13 can receive wrinkles arising on a curved portion of a shoulder belt portion 21 of the airbelt 20 (described later).

Further, as described above, the airbelt 20 including an inflatable shoulder belt portion 21 can be hung on the tube body 6 of the through anchor 1.

The airbelt 20 includes the shoulder belt portion 21, webbing 22, and lap belt portion 23. Shoulder belt portion 21 can be routed diagonally along the front side of the upper body of an occupant seated on a vehicle seat Z (FIG. 1). The tip of webbing 22 can be connected to the rear end of the shoulder belt portion 21. Lap belt portion 23 can be routed over a near portion of the hip of the occupant in a left and right direction. The rear end side of webbing 22 can be joined to retractor 24 such that webbing 22 is retractable and withdrawable. Webbing 22 is fabricated of a non-inflatable belt material similar to that of a conventional seat belt. Shoulder belt portion 21 and webbing 22 can be hung on tube body 6 of through anchor 1.

Furthermore, shoulder belt portion 21 can be formed such that a thick belt-like bag is folded to become a thin belt-like bag that is covered. When not in use, should belt portion 21 maintains a belt-like shape.

Figure 11:
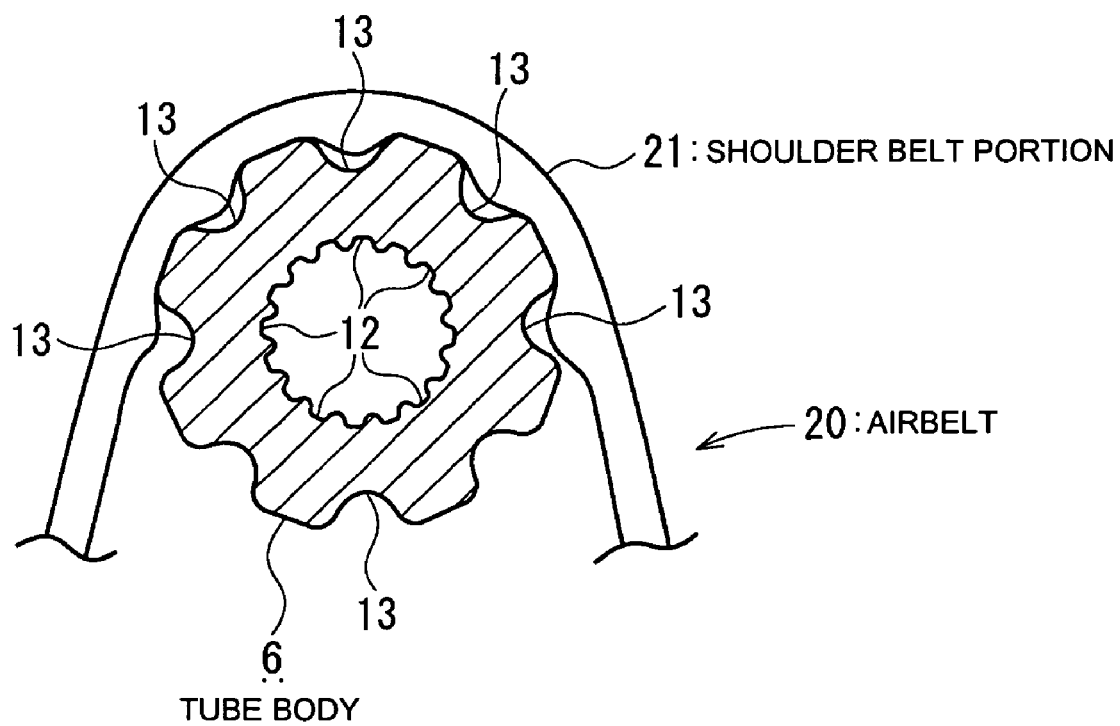
FIG. 11 shows a cross-section view of a portion similar to that of FIG. 8(a), showing a state in which an airbelt and a tube body are engaged with each other, according to an exemplary embodiment.

According to an exemplary embodiment, shoulder belt portion 21 can include a bag and cover constructed of multi-layers of base cloth. When shoulder belt portion 21 is bent along the perimeter of tube body 6 of through anchor 1, one side of shoulder belt portion 21 facing the tube body 6 is loosened, thereby causing wrinkles, as shown in FIG. 11. In this embodiment, grooves 13 are included on the outer periphery of the tube body 6. Further, due to the wrinkles created on shoulder belt portion 21 into the grooves 13, the shoulder belt portion 21 can bend smoothly along the outer periphery of the tube body 6. Shoulder belt portion 21 is thus able to pass smoothly through the through anchor 1.

The tip side of shoulder belt portion 21 and the tip side of lap belt portion 23 are each connected to a tongue 25. Lap belt portion 23 can also be constructed of a non-inflatable belt material similar to a conventional seat belt. The rear end side of lap belt portion 23 can also be joined to retractor 26 such that lap belt portion 23 is retractable and withdrawable. On the opposite side of retractor 26 across seat Z, a buckle device 27 is included such that tongue 25 can be latched onto.

Further, an inflator 28 is provided to the buckle device 27. Inflator 28 allows shoulder belt portion 21 to be inflated by supplying gas to the bag of the shoulder belt portion 21.

Retractors 24, 26 are included with a locking mechanism for locking withdrawal of webbing 22 and lap belt portion 23, respectively, in the event of an emergency such as a vehicle collision. Additionally, an EA mechanism is included for absorbing an impact applied to the occupant. The impact can be absorbed by gradually feeding webbing 22 and lap belt portion 23 when a load of a predetermined magnitude or more is applied to webbing 22 and lap belt portion 23 in the locking state.

Further, when a collision occurs and the airbelt 20 is being worn by an occupant, the locking of the retractors 24, 26 are activated. Thus, withdrawal of the webbing 22 and the lap belt portion 23 is locked. Additionally, inflator 27 is activated to inflate the airbelt 20. As a result, the occupant is restrained softly by the inflated airbelt 20.

When a pressing force of a predetermined value or more is applied to tube body 6 of through anchor 1 from the airbelt 20, the tube body 6 can move along guide surfaces 5a of the shaft 5. The movement can be oriented along the vehicles front direction against a force applied from the respective leaf springs 11, as shown in FIGS. 10(a), 10(b). Thus, the angular convex portions 5t of the shaft 5 engage with the recessed portions 12 of the tube body 6, thereby preventing revolution of the tube body.

Afterwards, due to activation of the EA mechanism, the webbing 22 and the lap belt portion 23 can be gradually withdrawn from the retractors 24, 26, respectively. Thus, an impact applied to the occupant can be absorbed. Since the tube body 6 does not rotate, a large friction is generated between the airbelt 20 and the tube body 6. Therefore, the withdrawal force applied from the webbing 22 to the EA mechanism of the retractor 24 becomes relatively small. It should be noted that reduction in the load applied to an EA mechanism during activation like this results in relaxation of the load-bearing properties required for the EA mechanism. As a result, cost reduction and weight reduction of the EA mechanism can be enabled.

Afterwards, when the movement of the occupant comes to a halt and the load applied from the occupant to the airbelt 20 becomes small, the pressing force applied to the tube body 6 from the airbelt 20 also becomes smaller than the predetermined value. Thus, the tube body 6 is pushed back along the guide surfaces 5a oriented along a vehicle rear direction due to a force applied from the respective leaf springs 11. As a result, the recessed portions 12 of the tube body 6 and the angular convex portions 5t of the shaft 5 are separated from each other, thereby releasing the locking of the tube body 6.

As described above, in the through anchor 1, the leaf springs 11 are included between the tube body 6 and the shaft 5. Further, the leaf springs 11 each apply a force to the tube body 6 such that the recessed portions 12 on the inner periphery of the tube body 6 and the angular convex portions 5t of the shaft are separated. As a result, the whole of the tube body 6 can be constructed of hard materials. Thus, the durability of the tube body 6 can be increased. Additionally, since a tube body similar to a conventional tube body constructed from low-cost plastic or similar materials can be employed, it is possible to construct the through anchor 1 at relatively low cost.

Furthermore, on the shaft 5 guide surfaces 5a are included for guiding movement of the tube body 6. The guide surfaces 5a extend along a direction parallel to the bisecting line L3 bisecting the intersection angle 0 constituted between the one extension direction L1 and the other extension direction L2. In the extension direction L1, the airbelt 20 extends on the side of the retractor 24 relative to the tube body 6. In the extension direction L2, the airbelt 20 extends on the side of an occupant relative to the tube body 6, in a state that the airbelt 20 is worn by the occupant. Therefore, when a pressing force of a predetermined magnitude or more is applied to the tube body 6 from the airbelt 20 while the airbelt 20 is being worn by an occupant, the direction of the pressing force and the extension direction of the guide surfaces 5a become parallel to each other. As a result, the tube body 6 approaches the shaft 5 while being guided by the guide surfaces 5a. Thus, the locking of the tube body 6 can be smoothly implemented.

When a pressing force is applied to the tube body 6 from the airbelt 20 while the airbelt 20 is not worn by an occupant (e.g. airbelt 20 is withdrawn for being worn, or the airbelt 20 is retracted upon release from being worn), then the direction of the pressing force and the extension direction of the guide surfaces 5a are intersected with each other. As a result, the tube body 6 can hardly approach the shaft 5. Thus, the tube body 6 is prevented or suppressed from being locked when the airbelt 20 is withdrawn and retracted. Therefore, withdrawing and retracting of the airbelt 20 can be smoothly carried out.

Further, it should be noted that according to the through anchor 1, as described above, when a pressing force of a predetermined value or more is applied to the tube body 6 from the airbelt 20 and the stopping mechanism is activated, and when the pressing force having been applied to the tube body 6 from the airbelt 20 becomes smaller than the predetermined value, the tube body 6 returns to its original position. The tube body 6 can return to its original position due to the force applied from the respective leaf springs 11. Thus, the tube body 6 becomes freely rotatable again. The through anchor 1 then returns to the usual state when no forces are applied to the through anchor 1. It is not necessary to replace the through anchor 1 every time the stopping mechanism is activated, which brings about an economical advantage.

Although according to various exemplary embodiments the through anchor 1 is installed in a two seat vehicle, it should be noted that the present invention is not limited to any particular model of vehicle. For example, the through anchor 1 can be installed in a vehicle equipped with a rear seat. It should also be noted that, when the present invention is applied to a seat belt apparatus for a rear seat of a vehicle, the through anchor is installed using the same installation structure or a similar installation structure as that used for the a two seat vehicle. Likewise, when the present invention is applied to a vehicle having a pillar portion, the through anchor may be installed on the pillar portion.

Figure 12:
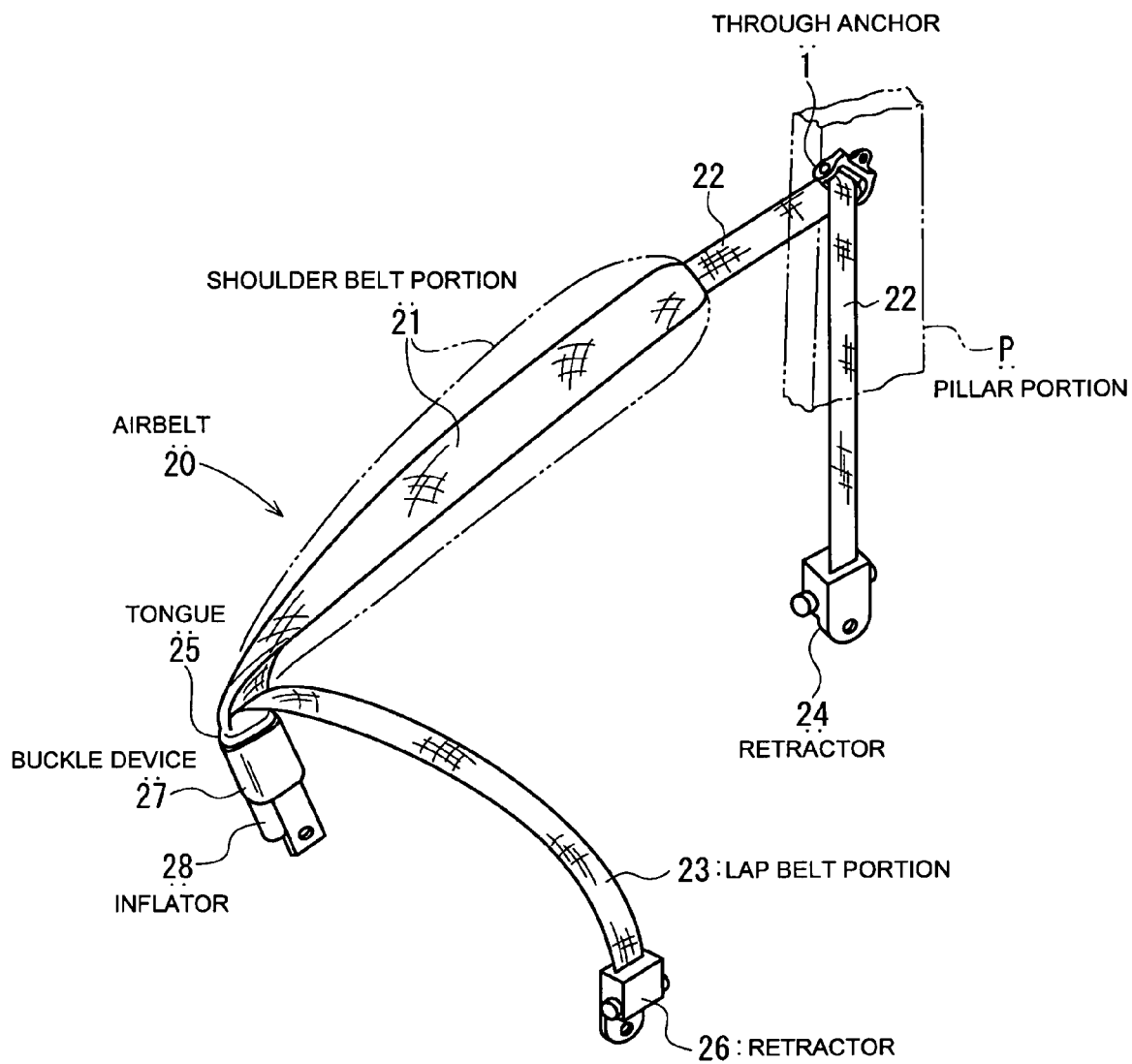
FIG. 12 is a perspective view of a seat belt apparatus, showing an arrangement in which the through anchor is attached to a pillar portion of a vehicle, according to an exemplary embodiment.

FIG. 12 shows a perspective view of a seat belt apparatus, according to an exemplary embodiment. An arrangement is shown in which a through anchor is attached to a pillar portion of a vehicle. Additionally, FIG. 13 shows a side view of the through anchor in the arrangement of FIG. 12, according to an exemplary embodiment.

Figure 13:
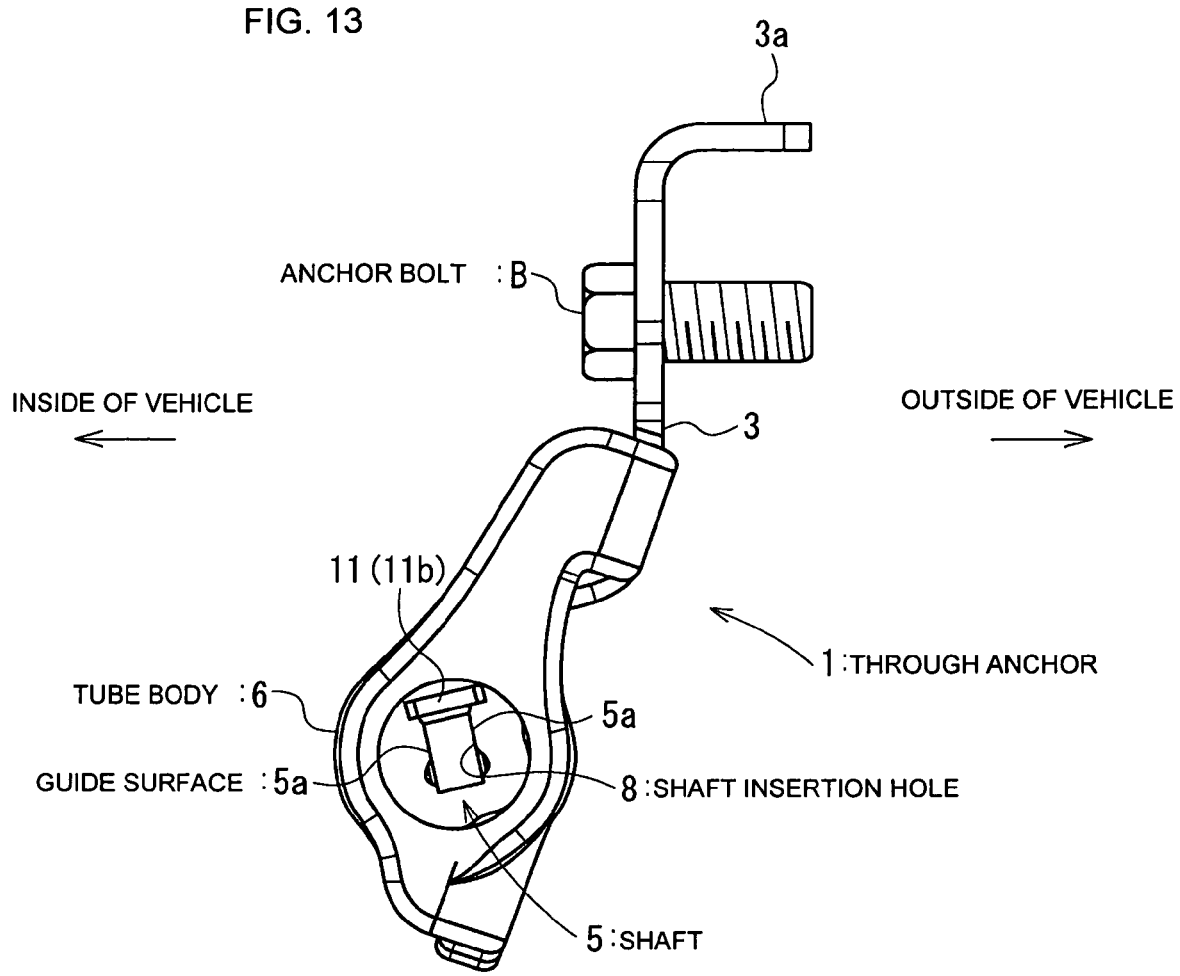
FIG. 13 is a side view of the through anchor in the arrangement of FIG. 12.

Referring to FIGS. 12-13, a through anchor 1 is installed on a pillar portion P of a vehicle body such that the extension direction of the shaft 5 occurs along the vehicles fore-and-aft direction. An anchor base 3 of the through anchor 1 can be configured such that the side of the shaft receiving portions 4 comes to the lower side. Further, the side of the bolt insertion hole 7 comes to the upperside and is attached rotatably to the pillar portion P using an anchor bolt B through the bolt insertion hole 7 along the vehicles fore-and-aft direction.

Further, a retractor 24 can be mounted in a position lower than the through anchor 1. An airbelt 20 is withdrawn upwardly from the retractor 24. The airbelt 20 can then be hung on a tube body 6 after being passed such that the airbelt 20 can be detoured from the vehicle exterior side of the tube body 6 to the vehicle interior side of the tube body 6 through the upperside of the tube body 6. Then, the airbelt 20 can be routed downward and forward of a seat (not shown) from the tube body 6.

As shown in FIG. 13, guide surfaces 5a of the shaft 5 extend in an up-and-down direction and are slightly inclined to the vehicle interior side with distance to its top end.

Further, the guide surfaces 5a extend in a direction parallel to the bisecting line bisecting the intersection angle. The intersection angle is constituted between one extension direction, in which the airbelt 20 extends on the side of the retractor 24 relative to the tube body 6, and another extension direction, in which the airbelt 20 extends on the side of an occupant relative to the tube body 6 wherein the airbelt 20 is routed on the front side of an occupant on a seat (not shown) and latched to a buckle device 27. Furthermore, the intersection angle between the bisecting line and each of the one extension directions is configured to be 16° to 28°, preferably 20°.

Further, the other configurations of this embodiment are similar to those of the embodiment of FIGS. 1 to 11 described above. Additionally, the reference numerals in FIGS. 12-13 identical to those in FIGS. 1-11 denote identical parts.

Furthermore, the actuation of the through anchor 1 in this embodiment is similar to that of the embodiment of FIGS. 1-11, except that the extension direction of the shaft 5 occurs along the vehicles fore-and-aft direction and the direction of pressing force applied to the tube body 6 from the airbelt 20 occurs along the vehicles up-and-down direction.

Additionally, the above embodiments each indicate an example of the present invention, and the present invention is not limited to each of the embodiments described above.

For example, the seat belt hung on the hanging shaft (tube body) of the through anchor may be not an airbelt, but a normal seat belt of a non-inflatable type. In this case, the grooves 13 on the outer periphery of the tube body 6 may be omitted.

The priority application, Japanese Patent Application No. 2007-258856, filed Oct. 2, 2007, including the specification, drawings, claims and abstract, is incorporated herein by reference in its entirety.

It is important to note that the arrangements of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt through anchor comprising:
a hanging shaft on which a seat belt withdrawn from a retractor is hung;
an anchor base supporting the both ends of the hanging shaft, wherein the hanging shaft includes a shaft non-rotatably supported by the anchor base at both ends, and a tube body rotatably attached outside the shaft;
a stopping mechanism for preventing rotation of the hanging shaft when a pressing force of a predetermined magnitude or more is applied to the tube body from the seat belt, wherein the stopping mechanism includes a projected portion formed on either of the outer periphery of the shaft or the inner periphery of the tube body, wherein a recessed portion is formed on the other of the outer periphery of the shaft or the inner periphery of the tube body, wherein the projected portion is engageable with the recessed portion, and a spring disposed between the tube body and the shaft, wherein the spring applies a force to the tube body such that the recessed portion and the projected portion are separated from each other, when the pressing force applied to the tube body from the seat belt is smaller than the predetermined value; and wherein, in the case when a pressing force of the predetermined value or more is applied to the tube body from the seat belt, the tube body approaches the shaft, and the projected portion and the recessed portion are mutually engaged, and thereby the rotation of the tube body is prevented.

2. The seat belt through anchor according to claim 1, wherein the spring is a leaf spring extending in a direction parallel to the axis center line of the hanging shaft.

3. The seat belt through anchor according to claim 1, wherein the shaft is provided with a guide surface for guiding the movement of the tube body and the tube body is movable along the guide surface in an approaching and separating direction with respect to the shaft,
wherein the guide surface extends in a direction parallel to a bisecting line bisecting an intersection angle constituted between one extension direction in which the seat belt extends on the side of the retractor relative to the tube body and another extension direction in which the seat belt extends on the side of an occupant seated on a seat relative to the tube body, in a state that the seat belt is worn by the occupant seated on the seat.

4. A seat belt apparatus, comprising:
a seat belt routed along the body of an occupant seated on a seat;
a seat belt through anchor comprising:
a hanging shaft on which a seat belt withdrawn from a retractor is hung;
an anchor base supporting the both ends of the hanging shaft, wherein the hanging shaft includes a shaft non-rotatably supported by the anchor base at both ends, and a tube body rotatably attached outside the shaft;
a stopping mechanism for preventing rotation of the hanging shaft when a pressing force of a predetermined magnitude or more is applied to the tube body from the seat belt, wherein the stopping mechanism includes a projected portion formed on either of the outer periphery of the shaft or the inner periphery of the tube body, wherein a recessed portion is formed on the other of the outer periphery of the shaft or the inner periphery of the tube body, wherein the projected portion is engageable with the recessed portion, and a spring disposed between the tube body and the shaft, wherein the spring applies a force to the tube body such that the recessed portion and the projected portion are separated from each other, when the pressing force applied to the tube body from the seat belt is smaller than the predetermined value; and wherein, in the case when a pressing force of the predetermined value or more is applied to the tube body from the seat belt, the tube body approaches the shaft, and the projected portion and the recessed portion are mutually engaged, and thereby the rotation of the tube body is prevented; and
a retractor, to which the rear end side of the seat belt is connected so as to be retractable and withdrawable.

5. A vehicle comprising:

a seat belt apparatus comprising:

a seat belt configured to be routed over the body of an occupant seated on a seat;

a seat belt through anchor comprising:

a hanging shaft on which a seat belt withdrawn from a retractor is hung;

an anchor base supporting the both ends of the hanging shaft, wherein the hanging shaft include a shaft non-rotatably supported by the anchor base at both ends, and a tube body rotatably attached outside the shaft;

a stopping mechanism for preventing rotation of the hanging shaft when a pressing force of a predetermined magnitude or more is applied to the tube body from the seat belt, wherein the stopping mechanism includes a projected portion formed on either of the outer periphery of the shaft or the inner periphery of the tube body, wherein a recessed portion is formed on the other of the outer periphery of the shaft or the inner periphery of the tube body, wherein the projected portion is engageable with the recessed portion, and a spring disposed between the tube body and the shaft, wherein the spring applies a force to the tube body such that the recessed portion and the projected portion are separated from each other, when the pressing force applied to the tube body from the seat belt is smaller than the predetermined value; and wherein, in the case when a pressing force of the predetermined value or more is applied to the tube body from the seat belt, the tube body approaches the shaft, and the projected portion and the recessed portion are mutually engaged, and thereby the rotation of the tube body is prevented; and a retractor, to which the rear end side of the seat belt is connected so as to be retractable and withdrawable.

6. The vehicle of claim 5, wherein the through anchor is mounted on a member in a rearward position relative to a vehicle seat so that the extension direction of the shaft occurs along the vehicles width.

7. The vehicle of claim 5, wherein the through anchor is mounted on a pillar portion of the vehicle so that the extension direction of the shaft becomes a substantially vehicle fore-and-aft direction.

8. A seat belt apparatus comprising:

a seat belt configured to restrain an occupant of a seat, a retractor attached to one end of the seat for retracting the seat belt;

an anchor through which the seat belt is configured to pass, wherein the anchor includes a first shaft for supporting the seat belt and a base supporting both ends of the first shaft, wherein the first shaft includes a second shaft non-rotatably supported by the base at both ends, and a tube body rotatably attached outside the second shaft;

a spring disposed between the tube body and the second shaft, wherein the spring is configured to apply a force so that the recessed portion and the projected portion are separated from each other;

a projected portion is formed on either of the outer periphery of the second shaft or the inner periphery of the tube body;

a recessed portion formed on the other of the outer periphery of the second shaft or the inner periphery of the tube body; and wherein the projected portion is configured to engage the recessed portion to thereby prevent rotation of the tube body when the force applied to the tube body by the seat belt is sufficient to overcome the force applied by the spring.

* * * * *